(12) United States Patent
Nguyen

(10) Patent No.: US 9,641,873 B1
(45) Date of Patent: May 2, 2017

(54) METHOD AND APPARATUS FOR CONTROLLING BROADCAST PROGRAMMING CONTENT

(75) Inventor: Thuy T. Nguyen, Weedin, CT (US)

(73) Assignee: The DIRECTV Group, Inc., El Segundo, CA (US)

( * ) Notice: Subject to any disclaimer, the term of this patent is extended or adjusted under 35 U.S.C. 154(b) by 1826 days.

(21) Appl. No.: 09/104,713

(22) Filed: Jun. 25, 1998

(51) Int. Cl.
  H04N 21/236 (2011.01)
  H04N 21/2365 (2011.01)
  H04N 21/432 (2011.01)

(52) U.S. Cl.
  CPC ... H04N 21/23614 (2013.01); H04N 21/4325 (2013.01)

(58) Field of Classification Search
  CPC ............. H04N 21/434; H04N 21/2362; H04N 21/2365; H04N 21/26283; H04N 21/4345; H04N 21/4347; H04N 21/6143; H04N 21/4384; H04N 21/44004; H04N 5/44
  USPC ................ 725/135, 138, 139, 37, 39, 48, 56
  See application file for complete search history.

(56) References Cited

U.S. PATENT DOCUMENTS

| | | | |
|---|---|---|---|
| 3,733,430 A | 5/1973 | Thompson et al. | |
| 3,848,082 A | 11/1974 | Summers | |
| 3,890,461 A | 6/1975 | Vogelman et al. | |
| 3,891,792 A | 6/1975 | Kimura | |
| 3,916,091 A | 10/1975 | Kirk, Jr. et al. | |
| 4,371,871 A * | 2/1983 | Adams | 340/825.26 |
| 4,536,791 A | 8/1985 | Campbell et al. | |
| 4,694,490 A | 9/1987 | Harvey et al. | |
| 4,975,771 A * | 12/1990 | Kassatly | H04N 7/08 348/385.1 |
| 5,231,494 A * | 7/1993 | Wachob | 725/139 |
| 5,335,277 A | 8/1994 | Harvey et al. | |
| 5,400,401 A | 3/1995 | Wasilewski et al. | |
| 5,469,431 A | 11/1995 | Wendorf et al. | |

(Continued)

FOREIGN PATENT DOCUMENTS

WO  WO 81/02961  10/1981

OTHER PUBLICATIONS

Brochure—*Replay 2000—the ultimate workstation for sports commentators and producers*, ORAD Hi-Tec Systems, Apr. 1995, 4 pages.

*Primary Examiner* — Hai V Tran
(74) *Attorney, Agent, or Firm* — Harness, Dickey & Pierce, PLC

(57) ABSTRACT

Method and apparatus for allowing viewers to control broadcast programming content includes a programming uplink facility, a satellite relay and a plurality of receiver stations. The receiver stations each include a satellite dish antenna, a low-noise-block (LNB) converter coupled to the antenna, an integrated receiver/decoder (IRD) coupled to a the LNB, and a conventional television display coupled to the IRD. In addition to primary programming, the uplink facility broadcasts special subordinate programming that is received by the IRD and made available for display on viewer command. The viewer can control programming content by instructing the IRD to either switch from the primary programming to the special subordinate programming, or to incorporate the special subordinate programming into the primary programming content. Preferably, the special subordinate programming has a direct relation to the substantive content of the program.

20 Claims, 7 Drawing Sheets

(56) References Cited

U.S. PATENT DOCUMENTS

| | | | |
|---|---|---|---|
| 5,519,780 A | | 5/1996 | Woo et al. |
| 5,534,941 A | | 7/1996 | Sie et al. |
| 5,596,705 A | | 1/1997 | Reimer et al. |
| 5,600,368 A | * | 2/1997 | Matthews, III .... H04N 7/17318 348/143 |
| 5,642,153 A | * | 6/1997 | Chaney ............... H04N 5/4401 348/731 |
| 5,724,091 A | | 3/1998 | Freeman et al. ................ 348/13 |
| 5,729,471 A | * | 3/1998 | Jain et al. ..................... 725/131 |
| 5,732,185 A | | 3/1998 | Hirayama et al. |
| 5,818,441 A | | 10/1998 | Throckmorton et al. |
| 5,892,554 A | | 4/1999 | DiCicco et al. |
| 5,894,320 A | * | 4/1999 | Vancelette ....................... 348/7 |
| 5,953,077 A | | 9/1999 | Honey et al. |
| 6,055,012 A | | 4/2000 | Haskell et al. |
| 6,144,375 A | | 11/2000 | Jain et al. |
| 6,177,930 B1 | | 1/2001 | Chernock et al. |
| 6,181,334 B1 | * | 1/2001 | Freeman .......... G06F 17/30017 348/E5.096 |

\* cited by examiner

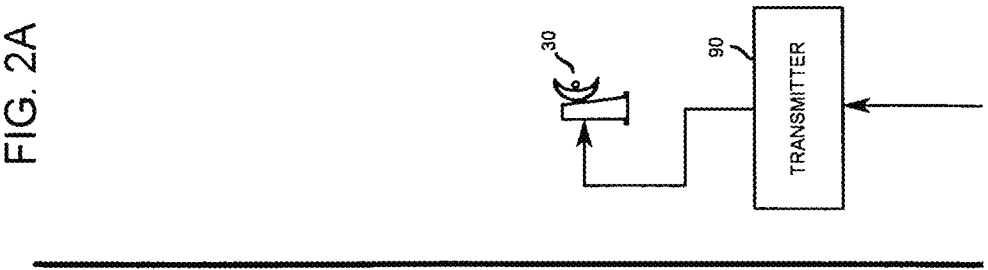
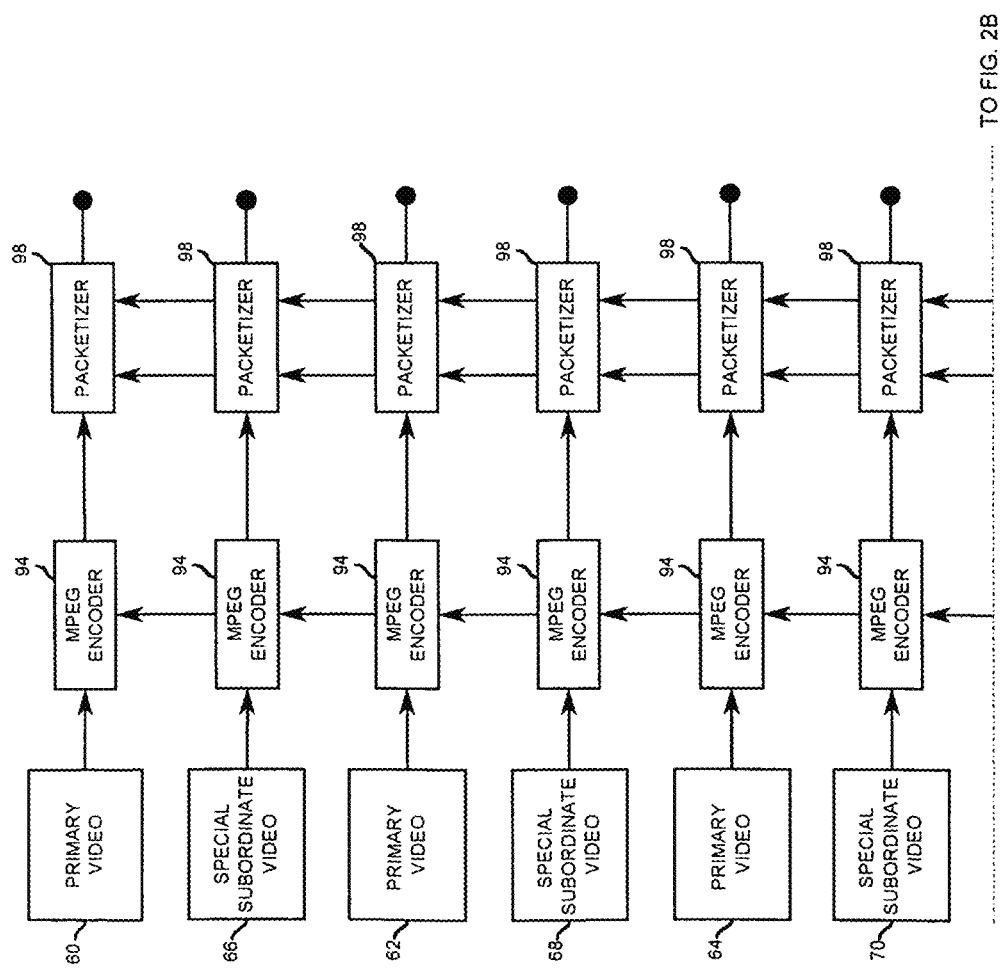

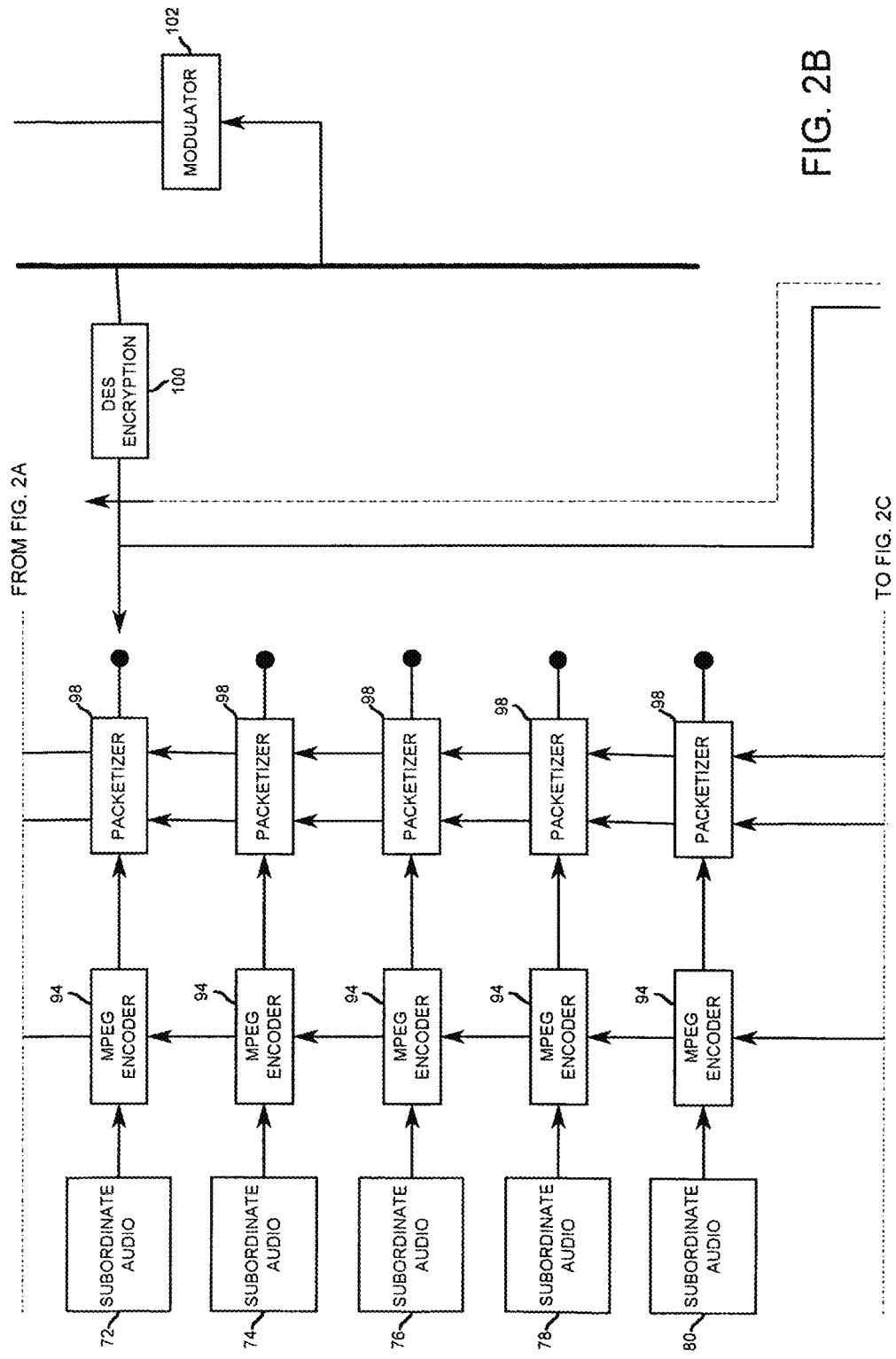

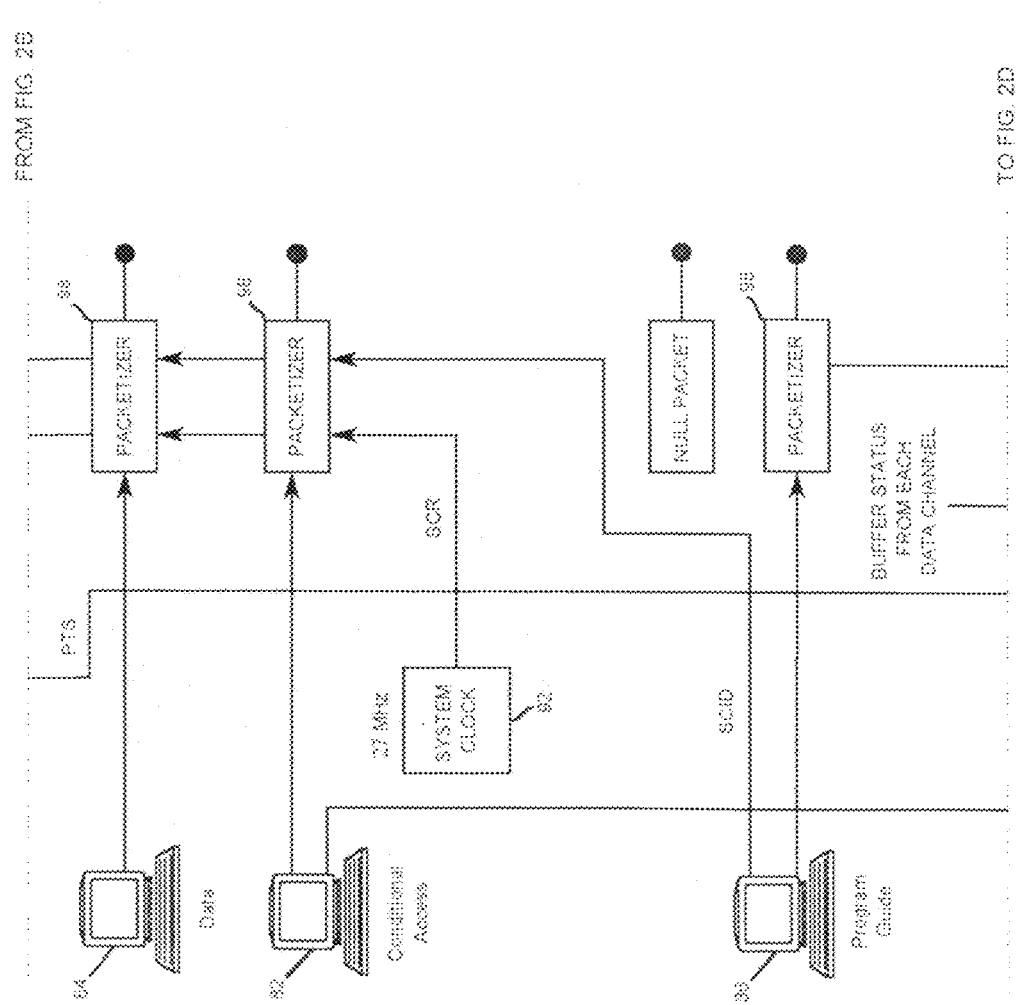

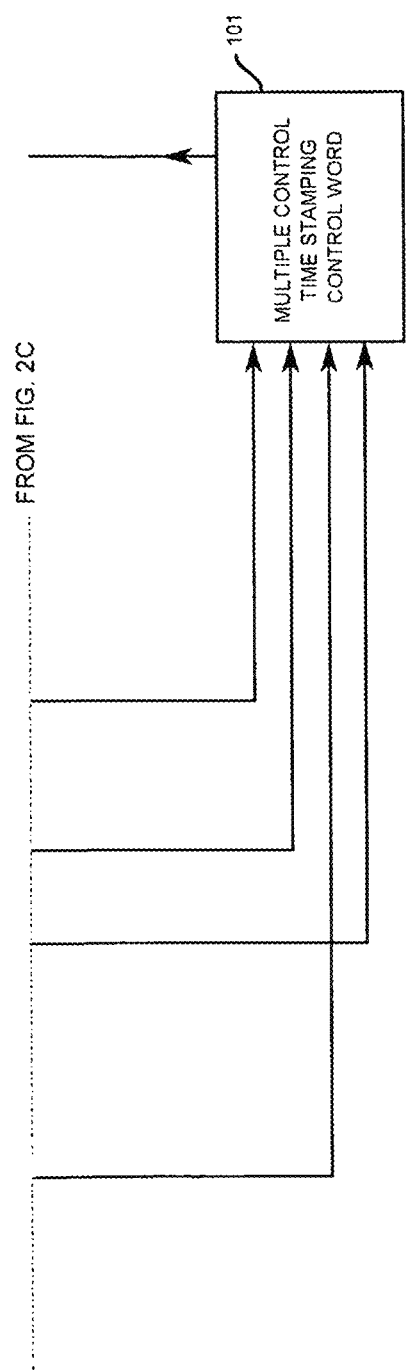

METHOD AND APPARATUS FOR CONTROLLING BROADCAST PROGRAMMING CONTENT

BACKGROUND OF THE INVENTION (a) Field of the Invention

The present invention relates generally to a method and apparatus for controlling how broadcast programming is displayed. More particularly, it relates to a method and apparatus for allowing viewers to control and/or alter the content of broadcast television programming in a flexible manner.

(b) Description of Related Art

Known television broadcast systems, including cable, analog satellite and conventional analog broadcast television systems, do not provide viewers with any significant degree of control over how broadcast programming is displayed. For example, most television broadcasts, such as sporting events, use several cameras to view the event taking place. The video signals from these cameras are fed to a control room for observation. A director, while observing all of the feeds from the cameras, selects the shot that will be broadcast to viewers. The director is free to choose any one of the many feeds for broadcast at any time. The decision as to which feed will be broadcast is a subjective decision made by the director, and viewers have no control over which camera shots are made available to them for display.

In addition to a program's video content, directors also control the timing, format and content of graphical information that may be displayed from time to time as part of the program presentation. For example, during a broadcast of a baseball game, broadcasters/directors routinely display statistics related to the game.

When a player comes to bat for the first time, the broadcaster temporarily superimposes on the broadcast image the players statistics such as his name, batting average, home runs and runs-batted-in (RBI). In subsequent at bats, the displayed statistics may include how the player has done so far in the current game. Similarly, when a new pitcher enters the game, the broadcaster temporarily superimposes on the broadcast image the pitchers statistics such as his won-loss record, earned-run-average (ERA), innings pitched, and strikeouts. The decision as to the timing, format and content of the displayed statistical information is made by the broadcaster/director, and viewers have no control over when and how such information is displayed.

Accordingly, it would be desirable to provide a method and apparatus that provides viewers with the flexibility to control how broadcast programming is displayed. More particularly, it would be desirable to provide a method and apparatus for allowing viewers to control and/or alter the content of broadcast television programming in a flexible manner.

SUMMARY OF THE INVENTION

The present invention may be embodied in a wireless direct-to-home satellite television broadcast system such as the DSS® digital satellite television system utilized by the DIRECTV® broadcast service. At a satellite uplink facility, television programming signals are digitized, packetized, multiplexed with other digital signals, compressed (if required), mated with error correction codes, modulated on a carrier and uplinked to a geosynchronous satellite. The satellite receives the uplinked digital bitstream and rebroadcasts it over a footprint that preferably covers a region of interest, such as the continental United States. Receiver units receive the digital bitstream of data packets from the satellite. The receiver units include an antenna, which preferably is in the form of a satellite dish. The antenna feeds the received digital bitstream to an integrated receiver/decoder (IRD) unit that recovers the transmitted bitstream and converts the television programming content of the bitstream to television programming signals capable of being displayed on a conventional NTSC television display device.

The digital packets that make up a program may be either primary or subordinate. Typically, the video packets are the primary packets, and all other packets associated therewith, including audio packets and related data packets, are considered subordinate. According to the present invention, "special subordinate" packets may be incorporated into the broadcast data stream, received at the viewer's receiver station, stored in the receiver's buffer memory (preferably RAM), and made available to the viewer upon local and/or broadcast command. Because the requested "special subordinate" packets are present in the system RAM, the switching time for incorporating special subordinate data into the IRD output should be short enough to appear instantaneous to the viewer. The special subordinate packets preferably bear a direct substantive relation to the content of a particular standard broadcast television program. For example, the special subordinate packets could contain video, audio, or textual/graphical programming content that is not currently being broadcast, such as the alternative camera angles, pictures, graphics, statistics, or any other visual data. Through accessing these special subordinate packets, the viewer could choose a video source from alternative camera feeds in a similar manner to the program's director.

The broadcast bitstream, which includes primary, subordinate, and special subordinate data, is received by the IRD. The IRD includes a tuner which may be tuned to any of the available satellite transponder frequencies. For a given programming channel, there are only certain packets in the received bitstream that must be gathered by the IRD in order to reconstruct the video/audio of the program of interest. The information about the transponder frequency and packets that are associated with a particular program is contained in the program guide data stream. The program guide data stream is broadcast on all satellite transponders so that channel selection information is always available to the IRD. The IRD distinguishes one packet from another by header information (i.e., service channel identifications or SCIDs) in each packet. The subordinate data packets and the special subordinate data packets are assigned SCIDs that are "associated" with the primary data packets. For example, if a viewer instructs the IRD to display ESPN, the IRD, via the program guide, determines the transponder frequency at which the ESPN programming is broadcast, along with the SCIDs of the packets that are needed to recreate ESPN. According to the present invention, the ESPN packets that are gathered would include packets having the SCID of the special subordinate data associated with ESPN.

The IRD gathers the special subordinate data and maintains it in buffer memory, preferably RAM, so that it is available to the viewer on command. Ordinarily, when the transmitted video has been compressed (e.g., MPEG), changing from one source of video to another, such as when a viewer changes from one channel to another, can result in a noticeable time delay between displaying the first channel and the second channel. For MPEG compression, this is primarily due to the need to receive and process at least two reference frames of data before the video can be constructed. However, according to the present invention, this delay can be avoided when switching from one video source on a channel to another video source on the same channel by having the special subordinate packets present and available in the system RAM. This allows the special subordinate data to be switched into the IRD output quickly enough to appear instantaneous to the viewer.

Typically, the special subordinate data includes the video, audio, or textual/graphical programming content that is available to the program director, but is not currently being chosen to be part of the broadcast program content. For example, the special subordinate data could be a digitized video signal from one or more of the alternative camera angles that are available to the director of a sporting event. The special subordinate data could also be a delayed version of the broadcast video, thereby allowing the user to display, on command, and without significant visible switching delays, an "instant replay" of selected portions of the broadcast. The special subordinate data could also be supplemental statistical data related to the broadcast. For example, during a broadcast baseball game, broadcasters routinely display statistics related to the game. When a player comes to bat for the first time, the broadcaster temporarily superimposes on the broadcast image the players statistics such as his name, batting average, home runs and runs-batted-in (RBI). In subsequent at bats, the displayed statistics may include how the player has done so far in the current game. Similarly, when a new pitcher enters the game, the broadcaster temporarily superimposes on the broadcast image the pitchers statistics such as his won-loss record, earned-run-average (ERA), innings pitched, and strikeouts. The special subordinate data could incorporate the same data displayed by the broadcaster so that the viewer can display the data at the viewer's discretion. The special subordinate data could also include data other than the broadcast data, for example, the player's career statistical data, the player's batting average against the current pitcher, the player's batting average over the past week, and other data. The special subordinate data could further include the current inning, score, paid attendance, and other statistical information related to the broadcast.

The invention may be embodied in an apparatus for receiving broadcast programming comprising: an antenna that receives broadcast programming comprising at least one program having primary visual program content and subordinate visual program content; a receiver coupled to said antenna and receiving said broadcast programming from said antenna, said receiver outputting said broadcast programming in a format suitable for display; said receiver programmed to output said primary visual program content or said subordinate visual program content in response to receiving a local command.

The invention may be further embodied in an apparatus for receiving broadcast programming comprising: an antenna that receives digital broadcast programming comprising at least one program having primary visual program content and subordinate visual program content; a receiver coupled to said antenna and receiving and decoding said digital broadcast programming from said antenna, said receiver/decoder outputting said broadcast programming in a format suitable for visual display; said receiver comprising a buffer memory for receiving said primary visual program content and said subordinate visual program content; said receiver further comprising a decoder operatively coupled to said buffer memory for decoding said primary visual program content and said subordinate visual program content; said receiver further comprising a processor operatively coupled to said buffer memory and said decoder for selectively routing said primary visual program content and said subordinate visual program content from said buffer memory to said decoder; said receiver further comprising input means operatively coupled to said processor for receiving local commands and routing said local commands to said processor to control the routing of said primary visual program content and said subordinate visual program content from said buffer memory to said decoder.

In alternative embodiments of the above-described apparatus, said broadcast programming comprises compressed digital packets; said primary visual program content comprises a first camera view of said program; and said subordinate visual program content comprises a second camera view of said program different from said first camera view of said program.

In yet another alternative embodiment of the above-described apparatus, said subordinate visual program content comprises a time delayed version of said primary visual program content.

In still another alternative embodiment of the above-described apparatus, said subordinate visual program content comprises numerical statistical information related to said primary visual program content.

In still another alternative embodiment of the above-described apparatus, said primary visual program content comprises a sports event.

In still another alternative embodiment of the above-described apparatus, said numerical statistical information comprises statistical information used to analyze said sports event.

The present invention may also be embodied in a method of receiving and processing broadcast programming at a receiver station, the steps comprising: receiving broadcast programming comprising at least one program having primary visual program content and subordinate visual program content; processing said broadcast programming to generate an output suitable for display; said processing comprising accepting local commands input by a viewer at said receiver station, said local commands selecting said primary visual program content as said output or said subordinate visual program content as said output.

The present invention may also be embodied in a method of receiving and processing broadcast programming at a receiver station, the steps comprising: receiving and storing in a buffer memory digital broadcast programming comprising at least one program having primary visual program content and subordinate visual program content; selecting and decoding, based on local commands input by a viewer at said receiver station, said primary visual program content or said subordinate visual program content; converting said selected and decoded primary visual program content or said selected and decoded subordinate visual program content into a format suitable for display.

In an alternative embodiment of the above-described methods, said broadcast programming comprises compressed digital packets.

In another alternative embodiment of the above-described methods, said primary visual program content comprises a first camera view of said program; and said subordinate visual program content comprises a second camera view of said program different from said first camera view of said program.

In still another alternative embodiment of the above-described methods, said subordinate visual program content comprises a time delayed version of said primary visual program content.

In still another alternative embodiment of the above-described methods, said subordinate visual program content comprises numerical statistical information related to said primary visual program content.

In still another alternative embodiment of the above-described methods, said primary visual program content comprises a sports event.

In still another embodiment of the above-described methods, said numerical statistical information comprises statistical information used to analyze said sports event.

Accordingly, the present invention provides several advantages. The invention allows the viewer to control how he/she views and/or displays broadcast programming, including choosing the actual content of the programming. The viewer can alter the video content of the programming by commanding the IRD to switch to "special subordinate" video information that is broadcast and available through the IRD. The viewer can also alter the video content of the programming by commanding the IRD to display special subordinate text/graphical information that is broadcast and available through the IRD. The special subordinate data may be a delayed version of the program, in which case the viewer can command the IRD to switch to the delayed broadcast, thereby allowing "instant replay" on viewer command.

The present invention provides the further advantage of allowing compressed video sources to be switched without having significant visible switching delays in going from one source to the other. By having the special subordinate packets present and available in the system RAM, the special subordinate data to be switched into the IRD output quickly enough to appear instantaneous to the viewer.

The invention itself, together with further objects and attendant advantages, will best be understood by reference to the following detailed description, taken in conjunction with the accompanying drawings.

BRIEF DESCRIPTION OF THE DRAWINGS

FIGS. 2A-2D are block diagrams illustrating the transmission station (or uplink facility) of the transmission and reception system shown in FIG. 1;

DESCRIPTION OF THE PREFERRED EMBODIMENTS

Figure 1:
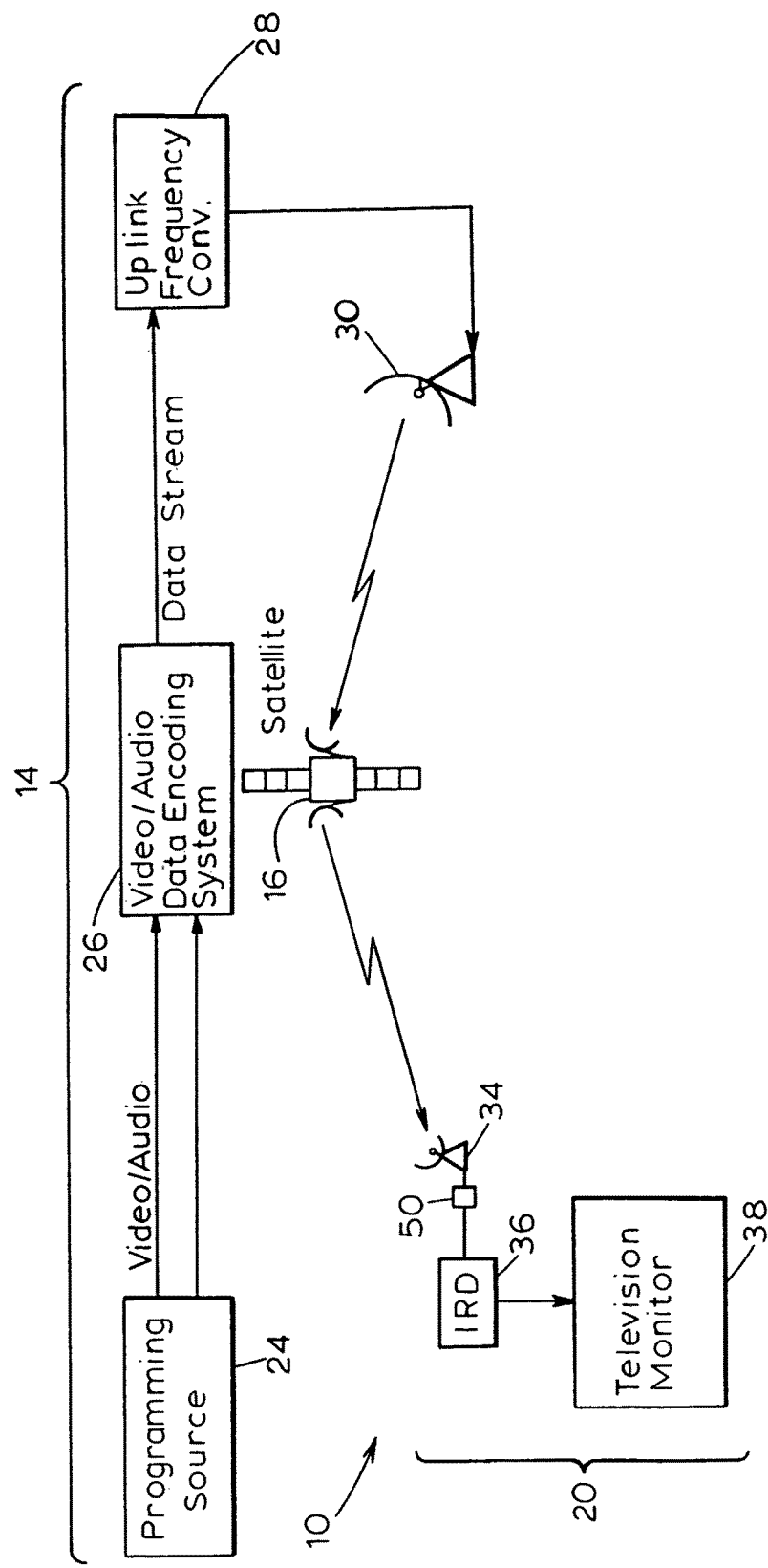
FIG. 1 is a diagram of a transmission and reception system embodying features of the present invention.

The present invention is preferably implemented in a digital satellite television distribution system such as the DSS® system utilized by the DIRECTV® broadcast service. Without reference to the figures, the following is general introduction to the DSS system and some aspects of the present invention.

The DSS system transports digital data, digital video and digital audio to a viewer's home via high powered Ku-band satellites. The various program providers send programming material to the uplink site. If the programming is received in analog form, it is converted to digital. The uplink site compresses the digital video/audio programming (if needed), encrypts the video and/or audio, and formats the information into data "packets" that are multiplexed with other data into a bitstream. The packetized bitstream is modulated on a carrier and transmitted to a satellite, where it is relayed back to earth and received and decoded by the viewer's receiver station.

The packets that make up a program may be either primary or subordinate. Typically, the video packets are the primary packets, and all other packets associated therewith, including audio packets and program guide packets, are considered subordinate. According to the present invention, "special subordinate" packets may be incorporated into the broadcast data stream, received at the viewer's receiver station, stored in the receiver's buffer memory, and made available to the viewer upon local and/or broadcast command. Because the requested "special subordinate" packets are present in the system RAM, the switching time for incorporating special subordinate data into the IRD output should be short enough to appear instantaneous to the viewer. The special subordinate packets preferably bear a direct substantive relation to the content of a particular standard broadcast television program. For example, the special subordinate packets could contain video, audio, or textual/graphical programming content that is not currently being broadcast, such as the alternative camera angles, pictures, graphics, statistics, or any other visual data. Through accessing these special subordinate packets, the viewer could choose a video source from alternative camera feeds in a similar manner to the program's director.

The broadcast bitstream, which includes primary, subordinate, and special subordinate data, is received by the IRD. The IRD includes a tuner which may be tuned to any of the available satellite transponder frequencies. For a given programming channel, there are only certain packets in the received bitstream that must be gathered by the IRD in order to reconstruct the video/audio of the program of interest. The information about the transponder frequency and packets that are associated with a particular program is contained in the program guide data stream. The program guide data stream is broadcast on all satellite transponders so that channel selection information is always available to the IRD. The IRD distinguishes one packet from another by header information (i.e., service channel identifications or SCIDs) in each packet. The subordinate data packets and the special subordinate data packets are assigned SCIDs that are "associated" with the primary data packets. For example, if a viewer instructs the IRD to display ESPN, the IRD, via the program guide, determines the transponder frequency at which the ESPN programming is broadcast, along with the SCIDs of the packets that are needed to recreate ESPN. According to the present invention, the ESPN packets that are gathered would include packets having the SCID of the special subordinate data associated with ESPN.

The IRD gathers the special subordinate data in a buffer memory so that it is available to the viewer on command. Ordinarily, when the transmitted video has been compressed (e.g., MPEG), changing from one source of video to another, such as when a viewer changes from one channel to another, can result in a noticeable time delay between displaying the first channel and the second channel. For MPEG compression, this is primarily due to the need to receive and process at least two reference frames of data before the video can be constructed. However, according to the present invention, this delay can be avoided when switching from one video source on a channel to another video source on the same channel by having the special subordinate packets present and available in the system RAM. This allows the special subordinate data to be switched into the IRD output quickly enough to appear instantaneous to the viewer.

The special subordinate data is preferably directly related to the content of its associated broadcast program. For example, the special subordinate data could be a digitized video signal from one or more of the alternative camera angles that are available to the director of a sporting event. The special subordinate data could also be a delayed version of the broadcast video, thereby allowing the user to display, on command, an "instant replay" of selected portions of the broadcast. The special subordinate data could also be supplemental statistical data related to the broadcast. For example, during a broadcast baseball game, broadcasters routinely display statistics related to the game. When a player comes to bat for the first time, the broadcaster temporarily superimposes on the broadcast image the players statistics such as his name, batting average, home runs and runs-batted-in (RBI). In subsequent at bats, the displayed statistics may include how the player has done so far in the current game. Similarly, when a new pitcher enters the game, the broadcaster temporarily superimposes on the broadcast image the pitchers statistics such as his won-loss record, earned-run-average (ERA), innings pitched, and strikeouts. The special subordinate data could incorporate the same data displayed by the broadcaster so that the viewer can display the data at the viewer's discretion. The special subordinate data could also include data other than the broadcast data, for example, the player's career statistical data, the player's batting average against the current pitcher, the player's batting average over the past week, and other data. The special subordinate data could further include the current inning, score, paid attendance, and other statistical information related to the broadcast.

Turning now to a more detailed description of a preferred embodiment of the invention, FIG. 1 illustrates a block diagram of a transmission and reception system 10 embodying features of the present invention. The illustrated system 10 includes a transmission station (or uplink facility) 14, a relay 16 and a plurality of receiver stations, one of which is shown at reference numeral 20. A wireless airlink provides the communications medium between the transmission station 14, the relay 16, and the receiver station 20. The transmission station 14 includes a programming source 24, a video/audio/data encoding system 26, an uplink frequency converter 28 and an uplink satellite antenna 30. The relay 16 is preferably at least one geosynchronous satellite. The receiver station 20 includes a satellite reception antenna/dish 34, a low-noise-block (LNB) 50 connected to the dish 34, an integrated receiver/decoder (IRD) unit 36 connected to the LNB 50, and a video, audio, or other presentation device such as a television monitor 38, connected to the receiver unit 36. A remote billing and accounting center (not shown) is connected to the IRD unit 36, preferably via a modem telephone connection.

FIGS. 2A-2D are related diagrams that, together, provide a more detailed illustration of a portion of the transmission station 14 shown in FIG. 1. FIGS. 2A-2B illustrate a typical configuration for generating the programming to be transmitted on one of the satellite's transponders. In a conventional analog satellite system, a single satellite transponder is used for a single satellite channel of programming. Because of the compressed digital architecture of a DSS system, more than one satellite channel of programming can be sent on the same transponder. FIGS. 2A-2C illustrate three "primary" video channels/sources 60, 62, 64, at least one "special subordinate" video source 66, 68, 70 for each of the "primary" video sources, five stereo "subordinate" audio sources 72, 74, 76, 78, 80 (one for each primary video source, plus two extra for other services), a "subordinate" conditional access (CA) data source 82, a "subordinate" PC-compatible data source 84 for transmitting at least one set of subordinate data packets for each primary video channel, and a "subordinate" program guide data source 86.

MPEG-2 (Motion Pictures Expert Group) compression techniques are used at the transmission facility 14 to minimize the data transfer rate. The "Motion Pictures Expert Group" is an organization that developed the MPEG-2 standard for transportation of moving images over communication data networks. The MPEG compression standard is based on the principle that images can contain a significant amount of redundancy from one frame of video to another. For example, background components often stay the same for many frames at a time. Compression is accomplished by predicting motion that occurs from one frame of video to the next, and transmitting motion vectors and background information. By coding only the motion and background difference instead of the entire frame of video information, the effective video data rate can be reduced from hundreds of Mbps to an average of 3 to 6 Mbps. This data rate is dynamic and can change depending on the amount of motion occurring in the video.

In addition to MPEG2 video compression, MPEG2 audio compression can also be used to reduce the audio rate. Audio compression is accomplished by eliminating soft sounds that are near loud sounds in the frequency domain. The compressed audio data rate can vary from 56 Kbs (Kilobytes per second) on mono signals to 384 Kbps on stereo signals.

Figure 3:
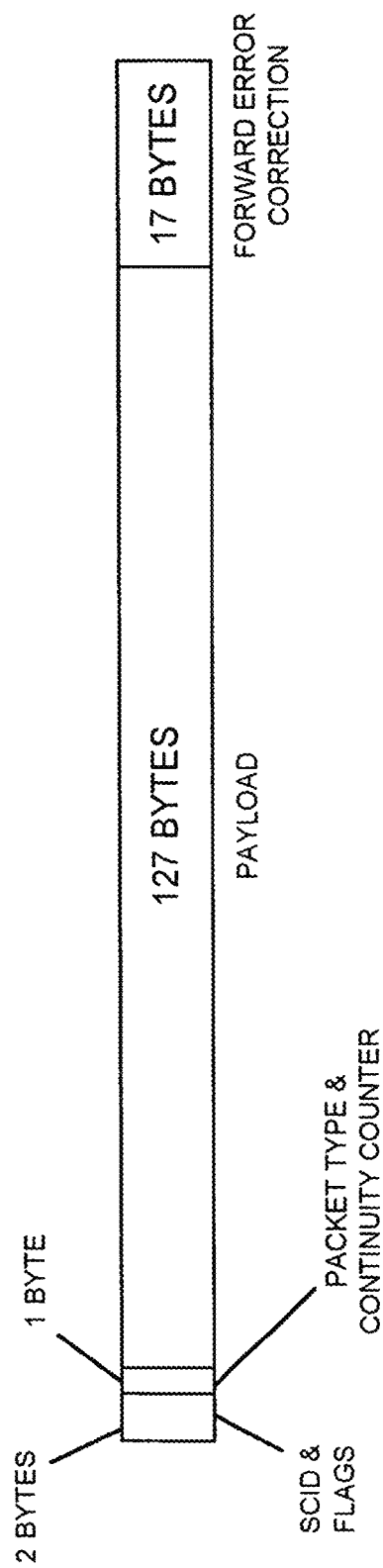
FIG. 3 is a diagram of a portion of the digital bitstream that may be transmitted and processed by the system shown in FIGS. 1, 2 and 4.

Referring now to FIG. 3, in addition to FIGS. 2A-2D, there is illustrated a diagram of a typical data packet that may be transmitted via the system shown in FIGS. 1, 2A-2D and 4. The preferred data packet shown in FIG. 3 is in the format and of the type used in the above-described DSS digital broadcast system. As shown, each data packet is 130 bytes long with and an additional 17 bytes of error correction codes appended thereto. The first two bytes of information contain the SCID and flags. The SCID (service channel ID) is a unique 12-bit number that uniquely identifies the packet's data channel. The flags are made up of four bits used primarily to control whether or not the packet is encrypted and, if encrypted, which key should be used to decrypt the packet. The third byte of information is made up of a four-bit packet type indicator and a four-bit continuity counter. The packet type identifies video data packet as one of four data types. When combined with the SCID, the packet type determines how the packet is to be used. The continuity counter increments once for each packet type and SCID. The next 127 bytes of information consists of the "payload" data, which is actual usable information sent from the source.

Referring again to FIGS. 2A-2D, the five types of data packets generated at the transmission station 14 of the system 10 are video, audio, conditional access (CA) data, PC-compatible serial data, and program guide data packets. Video and audio packets contain the visual and audio information of the programming, along with the "special subordinate" video packets of one aspect of the present invention. The conditional access packets contain information that is addressed to individual access cards of individual IRDs. This includes customer e-mail, access card activation information, and which channels the receiver is authorized to decode. PC compatible serial data packets can contain any form of data the program provider wants to transmit, such as stock reports or software. According to another aspect of the present invention, the serial data could include statistical data that is related to the programming content, for example supplemental statistics related to a broadcast sporting event.

The program guide data packets contain, inter alia, information that is used by the IRD to tune to a given channel of programming. Programming is transmitted in digital packets located on a particular transponder or frequency. The program guide data is available on all transponders and includes information about the transponder and data packets that are needed for a particular program. The program guide data also includes information that allows the IRD to construct and display a graphical listing of programming channels, times, descriptions, etc.

Returning specifically to the hardware configuration shown in FIGS. 2A-2B, a transmitter 90 is fed with data packets from a plurality of sources. The sources may include primary video sources 60, 62, 64, special subordinate video sources 66, 68, 70 related to the primary video sources 60, 62, 64, subordinate audio signal sources 72, 74, 76, 78, 80 related to the primary video sources 60, 62, 64, a PC-compatible data source 84 for generating special subordinate bitstreams related to the primary video sources 60, 62, 64 a conditional access data source 82, a program guide data source 86, and a 27 Mhz system clock source 92. Each primary video source 60, 62, 64 is encoded into an MPEG bitstream by MPEG video encoders 94. Each special subordinate video source 66, 68, 70 is encoded into an MPEG bitstream by MPEG video encoders 94. Each subordinate audio source 72, 74, 76, 78, 80 is encoded into an MPEG bitstream by MPEG audio encoders 96. Packetizers 98 compile each bitstream into data packets.

The program guide data source 86 generates the SCID identifiers for the various packets and provides this information to the packetizers 98 to be incorporated into the packets. The data packets from each packetizer are multiplexed together, and a DES encryptor 100 encrypts (i.e., scrambles) the video payloads of the video data packets. The encryptor 100 feeds a modulator 102 which feeds a transmitter 90 coupled to the uplink antenna 30. The modulator 102 may include forward a error correction (FEC) apparatus for generating error parity bytes and interleaving them into portions of the packet signal.

The program guide data source 86 also generates the program guide data packets containing, inter alia, information that is used by the IRD to tune to a given channel of programming. Such information may include the so-called "SCID list" for each channel, which includes the SCIDS of the data packets that are associated with a given channel of interest and must therefore be gathered in order to display that channel. The program guide data is provided to the packetizers 98 and made available on all transponders. The program guide data includes information about the transponder and data packets that are needed for a particular program. The program guide data also includes information that allows the IRD to construct and display a graphical listing of programming channels, times, descriptions, ratings, etc.

The encryptor 100 uses a conventional encryption "algorithm" formula known as Digital Encryption Standard (DES) to encrypt the video information. The keys for enabling the IRD to decode data, or for decrypting encrypted data, are calculated according to a secure algorithm in the customer's access card which is inserted into the IRD. The access card provides a valid key (also known as a "code word" (CW)) to IRD which allows the IRD to decode and decrypt the data. The encryptor 100 is controlled by a control block 101. The control block 101 performs the functions of multiplex control, time stamping, and conditional access encoding.

Figure 4:
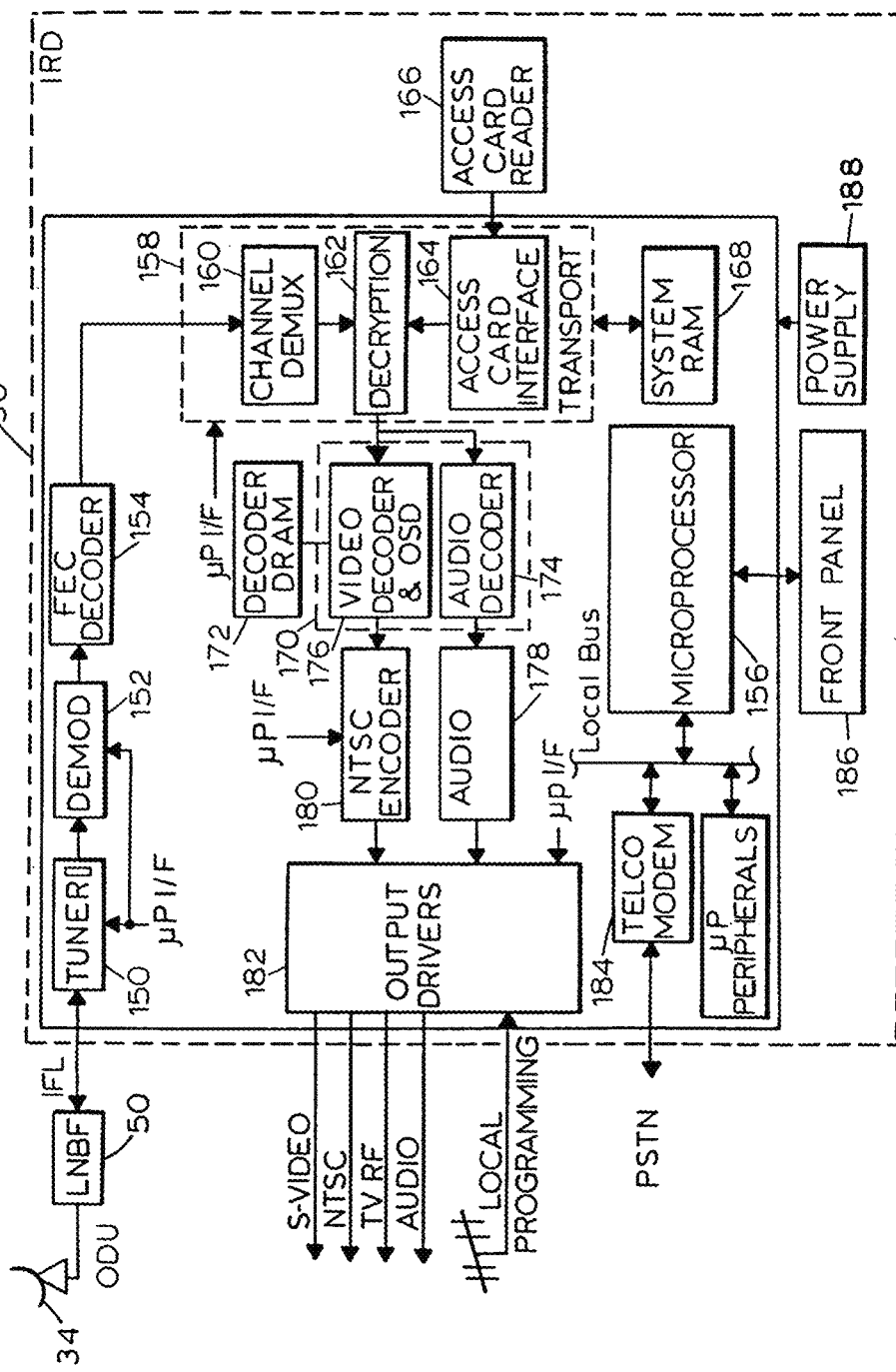
FIG. 4 is a diagram of the integrated receiver/decoder (IRD) shown in FIG. 1.

FIG. 4 is a more detailed block diagram of a portion of the receiver station 20 shown in FIG. 1. The satellite dish antenna 34 transfers the received satellite signal to a conventional LNB circuit 50 which then passes the signal to the IRD 36. The IRD 36 includes a tuner 150, demodulator 152, FEC decoder 154, a microprocessor 156, a transport circuit 158, a channel demultiplexer 160, decryption circuit 162, an access card interface 164, an access card reader 166, a system RAM 168, an audio/video decoder circuit 170 having a random-access-memory (RAM) 172, audio decoder 174, video decoder 176, an audio digital-to-analog circuit 178, an NTSC encoder 180, output drivers 182, a modem connection 184, a front panel user interface 186, and a power supply 188, coupled together as illustrated.

The transmitted signal is captured by the antenna 34 and coupled through the LNB 50 to a tuner 150 and demodulator 152. The tuner 150 is controlled by the microprocessor 156 to select a desired transponder carrier frequency. The selected carrier is demodulated, and the modulating signal is output from the demodulator 152 in binary form. The modulating signal is applied to a forward error correction (FEC) circuit 154, which corrects correctable errors and generates an error signal for respective signal packets which contain non-correctable errors. The FEC circuit 154 outputs a time division multiplexed packetized bitstream signal including the master program guide data and a plurality of programs.

The packet stream from the FEC 154 is applied to a transport circuit 158. The transport circuit 158 includes channel demultiplexer 160, DES decryptor 162, and access card interface 164 circuits for selecting packets of interest from the multiplexed packet stream (i.e., demultiplexing), decrypting the selected packets (if needed), and separating the service payloads from the selected packets.

At system start up, the system microprocessor 156 controls the channel demultiplexer 160 to detect occurrences of packets containing the master guide SCID. On detection of master guide packets, the channel demultiplexer 160 conditions the system RAM 168 to store the master guide packet payloads in a predetermined block of RAM memory 168. The microprocessor 156, responsive to user commands input via the front panel (or user interface) 186, scans this block of memory for program data to determine the SCIDs associated with program components of the program which the user wishes to view. The SCIDs that identify the packets associated with a program may be either primary or subordinate. Typically, the video packets are the primary packets, and all other packets associated therewith, including audio packets, conditional access packets, and program guide packets, are considered subordinate. According to certain aspects of the present invention, specialized SCID's may be included in the known SCID lists, to identify the available special subordinate datastreams being broadcast. These lists update the remote IRD's, and advises them of available special subordinate bitstreams (if any) which may be selected and used in association with a primary program.

According to the present invention, the special, subordinate SCIDs and their associated packets are incorporated into the broadcast data stream, stored in the IRD buffer memory, and made available to the viewer upon local command. The special subordinate SCIDs could identify packets containing alternate feeds of video from the program event, pictures, graphics, statistics, or any other visual data. Through accessing these special subordinate video SCIDs, the user would potentially be able to choose a video source from alternative camera feeds that are typically chosen by the program's director.

The general processing of received data packets that reach the transport 158 of the IRD 36 will now be described in more detail, with specific reference to FIG. 4. As shown in FIG. 4, the transport 158 receives the transport stream of digitized data packets containing video, audio, scheduling information, and other data. The digital packet information contains identifying headers (SCIDs) as part of its overhead data. Under control of the microprocessor 156, the channel demultiplexer 160 filters out packets that are not currently of interest, and routes the data packets that are of interest through the decryption and access control circuits 162, 164, 166 to their proper downstream destination. The decryption circuit 162 provides decryption for the data packets that have been encrypted. The access control circuits 164, 166 provide access control by any conventional means. For example, access control may be achieved by requiring a data packet to have a proper authorization code in order to be passed to the decryptor 162 and/or video decoder 176. The access card reader 166 can interface with an access card (not shown) that will receive the packet authorization code, determine its validity, and generate a code (also known as a "code word" (CW)) that confirms to the transport 158 that the subject data packet is authorized. Preferably the CW for enabling the IRD to decode data, or for decrypting encrypted data, is calculated by the access card according to a secure algorithm in the card.

The payloads of authorized packets of interest are stored in system RAM 168 for buffering, and the audio/video decoder 170 requests (via the microprocessor 156) the RAM 168 contents as needed. The authorized payloads include "primary", "subordinate", and "special subordinate" data. The requested data is routed from the RAM 168 through the transport 158 to the audio/video decoder 170. If the request is for primary video data and its associated subordinate audio data, primary video data and subordinate audio, which are stored in the RAM 168, are routed through the transport 158 to the video/audio decoder's DRAM 172 until it is time for the data to be decoded. At that time, the primary video data is routed to the video decoder 176 (which includes on-screen display circuitry) and the NTSC encoder 180. The video decoder 176 reads in the compressed video data from the DRAM 172, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 172. At a later time, the image is read out of the frame buffer in DRAM 172 and passed through the on-screen display circuitry to the NTSC encoder 180. The on-screen display circuitry (located in the video decoder 176) generates the graphics that allow text such an the electronic program guide data to be displayed. The NTSC encoder 78 converts the digital video signals to analog according to the NTSC standard, thereby allowing video to be output to a conventional television monitor 38 (shown in FIG. 1) and displayed.

At the same time, subordinate audio payload data is routed from the DRAM 172 to the audio decoder 174 and the audio D/A 178. The audio decoder 174 reads in the compressed audio data from the DRAM 174. The audio decoder 174 takes the compressed digital audio data stream in approximately 24 millisecond chunks and transforms the quantized frequency components back into a time domain signal which is then provided to the audio D/A 178. The output of the audio D/A 178 is suitable for input to a conventional amplifier/loudspeaker system (not shown) for generating audible sounds.

According to the present invention, viewers may also request the display of the "special subordinate" payload data, which is present in the system RAM 168 for buffering. The requested data is processed substantially the same as described above. Because the special subordinate data is available in buffer memory, the switching time for incorporating special subordinate data into the IRD output should be short enough to appear instantaneous to the viewer.

As an example, a viewer is watching a broadcast professional basketball game. The viewer leaves the room momentarily to get a beverage and hears the announcers yell "Oh, what a move by Jordan!" She rushes back to the television only to find that she missed the play, and that there was no foul on the play that would stop the action and allow the broadcasters to show a replay. The viewer grabs her remote control and hits a button labeled "Replay Video". The remote control provides a signal to the IRD 36 via the front panel 186 that instructs the microprocessor 156 to switch from primary video to the special subordinate video. In this case, the special subordinate video is a delayed version of the primary video. The IRD now outputs the delayed primary video, which is delayed long enough to include the portion of the basketball game that she missed. Alternatively, the display could be divided between the primary video and the delayed primary video (or special subordinate video). To support the simultaneous display of both primary and subordinate MPEG compressed video, it may be necessary to have an IRD unit which a has two sets of MPEG decoding circuitry, or alternatively a single decoder capable of processing and de-compressing more than one video source. One MPEG decoder could provide the primary video and the second MPEG decoder could provide the subordinate video.

After watching the replay, the viewer notes that the broadcaster is using the "moving camera" that follows the action of the ball and creates a different visual impression than the traditional stationary camera angles. She is just starting to appreciate this "moving view" when the broadcaster switches back to the stationary cameras. The viewer grabs her remote control, and hits a button labeled "Camera". The remote control provides a signal to the IRD 36 via the front panel 186 that instructs the microprocessor 156 to switch from primary video to the special subordinate video. In this case, the special subordinate video is the moving camera view. The IRD now replaces the primary video with the moving camera view. Alternatively, the display could be divided between the primary video and the moving camera view (or special subordinate video). As noted above, to support the simultaneous display of both primary and subordinate MPEG compressed video, it may be necessary to have an IRD unit which a has two sets of MPEG decoding circuitry, or alternatively a single decoder capable of processing and de-compressing more than one video source.

Later in the same game, the viewer notices that both Jordan and Pippen have been having a particularly productive game and wonders just who are the game's current high scorers. The viewer grabs her remote control and hits a button labeled "Game Stats". The remote control provides a signal to the IRD 36 via the front panel 186 that instructs the microprocessor 156 to utilize the special subordinate data in buffer memory. In this case, the special subordinate data are statistics for the current game, including the game's high scorers. The statistics are converted via the Video Decoder/OSD 176 to a graphical/textual presentation that could either replace the primary video in the full screen, or be presented as an overlay on the primary video.

Later in the same game, Jordan comes to the free throw line with 3 seconds left and the Bulls down by 1 point. The broadcaster temporarily flashes Jordan's free throw percentage, but the viewer misses it. The viewer grabs her remote control and hits a button labeled "Replay Game Stat". The remote control provides a signal to the IRD 36 via the front panel 186 that instructs the microprocessor 156 to utilize the special subordinate data in buffer memory. In this case, the special subordinate data is a delayed version of whatever statistics the broadcaster shows during the game. The statistics are converted via the Video Decoder/OSD 176 to a graphical/textual presentation that could either replace the primary video in the full screen, or be presented as an overlay on the primary video.

Accordingly, the present invention provides several advantages. The invention allows the viewer to control how he/she views and/or displays broadcast programming, including choosing the actual content of the programming. The viewer can alter the video content of the programming by commanding the IRD to switch to "special subordinate" video information that is broadcast and available through the IRD. The viewer can also alter the video content of the programming by commanding the IRD to display special subordinate text/graphical information that is broadcast and available through the IRD. Where the special subordinate data is a delayed version of the program, the viewer can command the IRD to switch to the delayed broadcast, thereby allowing "instant replay" on viewer command.

The present invention provides the further advantage of allowing compressed video sources to be switched without having significant visible switching delays in going from one source to the other. By having the special subordinate packets present and available in the system RAM, the special subordinate data to be switched into the IRD output quickly enough to appear instantaneous to the viewer.

Of course, it should be understood that a range of changes and modifications can be made to the preferred embodiment described above. For example, the present invention is described in connection with a particular hardware and processing structure for transmitting and receiving digital video/audio and related data. However, a wide variety of transmitting and receiving structures could be utilized as long as the essential movie distribution features described herein are present. For example, the receive antennae could be larger than 18 inches to improve link margin and limit any fade outs during bad weather. The digital transmission format could be digital cable, LMDS, MMDS, or other similar formats. It is therefore intended that the foregoing detailed description be regarded as illustrative rather than limiting and that it be understood that it is the following claims, including all equivalents, which are intended to define the scope of this invention.

What is claimed is:

1. An apparatus for receiving broadcast programming comprising:
    a receiver receiving a service channel identifier list comprising a primary service channel identifier associated with a video program and a subordinate service channel identifier associated with the video program, said receiver storing the service channel identifier list therein, said receiver receiving a data stream comprising primary visual program data packets having the primary service channel identifier and subordinate visual program data packets having a special subordinate service channel identifier, said receiver simultaneously storing both the primary visual program data packets and the subordinate visual program data packets in a buffer memory, wherein said primary visual program data packets comprise a live broadcast and wherein said subordinate visual program data packets comprise a time delayed version of said primary visual program data packets, wherein said subordinate visual program data packets stored in the buffer memory are sufficient to allow an instant replay of the time delayed version of a missed portion of said primary visual program data packets;
    said receiver comprising an audio/video decoder requesting either the primary visual program data packets or said subordinate visual program data packets in response to receiving a local command wherein said receiver, in response to the local command, is programmed to communicate one of the primary visual program data packets or the subordinate visual program data packets from the buffer memory to the audio/video decoder to form selected data packets, wherein said receiver is further programmed to decode the selected data packets to form decoded packets, said receiver programmed to store the decoded packets as an image in a frame buffer, and to output the image to a display associated with the receiver.

2. The apparatus of claim 1 wherein:
    said primary visual program data packets comprise a first camera view of said video program; and
    said subordinate visual program data packets comprise a second camera view of said program different from said first camera view of said video program.

3. The apparatus of claim 1 wherein:
    said subordinate visual program data packets comprise numerical statistical information related to said primary visual program data packets.

4. The apparatus of claim 3 wherein said primary visual program data packets comprise a sports event.

5. The apparatus of claim 4 wherein said numerical statistical information comprises statistical information used to analyze said sports event.

6. An apparatus for receiving broadcast programming having a video program comprising:
    a receiver receiving a service channel identifier list comprising a primary service channel identifier associated with the video program and a subordinate service channel identifier associated with the video program, said receiver storing the service channel identifier list therein, said receiver receiving the video program comprising primary visual program content having the primary service channel identifier and subordinate visual program content having a special subordinate service channel identifier, wherein said primary visual program content comprises a live broadcast and wherein said subordinate visual program content comprises a time delayed version of said primary visual program content;
    said receiver comprising a buffer memory for receiving and simultaneously storing said primary visual program content and said subordinate visual program content, wherein said subordinate visual program content stored in the buffer memory is sufficient to allow an instant replay of the time delayed version of a missed portion of said primary visual program content;
    said receiver further comprising a decoder operatively coupled to said buffer memory for requesting one of said primary visual program content and said subordinate visual program content to form requested content, decoding the requested content;
    said receiver further comprising input means operatively coupled to a processor for receiving a local command and routing said local command to said processor to control the decoder to route the requested content from said buffer memory to said decoder, wherein said decoder decodes the requested content to form decoded content and stores the decoded content in a frame buffer as an image;

said receiver communicating the image from the frame buffer to a display associated with the receiver.

7. The apparatus of claim 6 wherein:

said primary visual program content comprises a first camera view of said video program; and said subordinate visual program content comprises a second camera view of said video program different from said first camera view of said video program.

8. The apparatus of claim 6 wherein:

said subordinate visual program content comprises numerical statistical information related to said primary visual program content.

9. The apparatus of claim 8 wherein said primary visual program content comprises a sports event.

10. The apparatus of claim 9, wherein said numerical statistical information comprises statistical information used to analyze said sports event.

11. A method of receiving and processing broadcast programming at a receiver, comprising:

receiving a service channel identifier list comprising a primary service channel identifier associated with a data stream and a subordinate service channel identifier associated with a video program;

storing the service channel identifier list therein;

receiving, at the receiver, the data stream comprising primary visual program data packets and subordinate visual program data packets having a special subordinate service channel identifier, wherein said primary visual program data packets comprise a live broadcast and wherein said subordinate visual program data packets comprise a time delayed version of said primary visual program data packets;

storing the primary visual program data packets in a buffer memory of the receiver;

storing subordinate visual program data packets in the buffer memory of the receiver sufficient to allow an instant replay of the time delayed version of a missed portion of said primary visual program data packets;

requesting either the primary visual program data packets or subordinate visual program data packets from an audio/video decoder of the receiver in response to a local command to form selected packets;

communicating the selected packets to the audio/video decoder in response to requesting;

decoding the selected packets to form decoded packets;

storing the decoded packets as an image in a frame buffer; and displaying the image as a display on a display associated with the receiver.

12. The method of claim 11 wherein:

said primary visual program data packets comprise a first camera view of said video program; and said subordinate visual program data packets comprise a second camera view of said video program different from said first camera view of said video program.

13. The method of claim 11 wherein:

said subordinate visual program data packets comprise numerical statistical information related to said primary visual program data packets.

14. The method of claim 13 wherein said primary visual program data packets comprise a sports event.

15. The method of claim 14 wherein said numerical statistical information comprises statistical information used to analyze said sports event.

16. A method of receiving and processing a live broadcast video program at a receiver, comprising:

receiving a service channel identifier list comprising a primary service channel identifier associated with the live broadcast video program and a subordinate service channel identifier associated with the live broadcast video program;

storing the service channel identifier list therein;

receiving and simultaneously storing in a buffer memory primary visual program content of the live broadcast video program comprising the primary service channel identifier and subordinate visual program content having a special subordinate service channel identifier, wherein said subordinate visual program content is stored in the buffer memory prior to receiving a local command to select and decode said subordinate visual program content based on the service channel identifier list, wherein said subordinate visual program content comprises a time delayed version of said primary visual program content, wherein said subordinate visual program content stored in the buffer memory is sufficient to allow an instant replay of the time delayed version of a missed portion of said primary visual program content;

generating a request signal at the decoder in response to the local command;

communicating the subordinate visual program content to the decoder;

selecting and decoding said subordinate visual program content to form decoded content;

storing the decoded content in a frame buffer as an image to form decoded content; and communicating the image from the frame buffer to a display associated with the receiver.

17. The method of claim 16 wherein:

said primary visual program content comprises a first camera view of said live broadcast video program; and said subordinate visual program content comprises a second camera view of said live broadcast video program different from said first camera view of said live broadcast video program.

18. The method of claim 16 wherein:

said subordinate visual program content comprises numerical statistical information related to said primary visual program content.

19. The method of claim 18 wherein said primary visual program content comprises a sports event.

20. The method of claim 19 wherein said numerical statistical information comprises statistical information used to analyze said sports event.

* * * * *